UNITED STATES PATENT OFFICE.

WILLIAM ADAMSON, OF PHILADELPHIA, PENNSYLVANIA.

IMPROVEMENT IN EXTRACTING FATTY MATTERS FROM TANNERS' SCRAPS, &c.

Specification forming part of Letters Patent No. 163,130, dated May 11, 1875; application filed September 1, 1874.

CASE C.

*To all whom it may concern:*

Be it known that I, WM. ADAMSON, of Philadelphia, Pennsylvania, have invented a Process for Extracting Fatty and Oily Matter from Tanners' and Curriers' Scraps and other offal, of which the following is a specification:

The object of my invention is to extract the fatty and oily matter from tanners' and curriers' scraps and other offal, by kneading and crushing the same in dilute acid, the latter uniting with alkali, alkaline earths, or oxides, with which these scraps are always more or less impregnated, the fat and grease, thus set free, being readily expressed from the mass.

The scraps of tan-yards and curriers' shops always contain more or less fat or grease used in the process of preparing the leather. Quantities of fatty scraps also result from bone-boiling operations, and from the manufacture of candles and the rendering of fat, the greasy and oily matter being combined with wool, hair, animal tissues, &c., and the same remarks will apply to "scutch" or spent glue-stock, and the residuum of glue-factories, the oils and fats of which are more less combined with alkali, alkaline earths, or oxides.

Acids have been heretofore used for extracting fats from these substances, by placing them in vessels and applying the acid, which was permitted to act slowly on the mass while the latter remained in a quiescent condition, or the simple stirring of the mass was resorted to in some cases. The difficulty accompanying this old acid treatment has been that the acid, after combining with the earthy matter, would form a cover on the material treated, so that the remaining acid would be impeded in its action. Thus large quantities of the strongest acids were required to insure the thorough extraction of the fat, and this strong acid has such a deteriorating effect as to render it almost worthless.

In order to obviate this difficulty, I adopt a combined mechanical and chemical treatment—that is to say, I knead the scraps in a vessel containing sulphuric or other appropriate acid sufficiently diluted to prevent it from injuring the fat.

The kneading and crushing process necessarily exposes and agitates every part of the scraps, and so disintegrates the same that the weak acid has more influence on them as regards the setting of the fatty and oily matter free than a stronger acid acting on scraps in a quiescent state, or while the scraps are simply agitated without kneading them. The effect of the acid is to unite with the alkali, alkaline earth, and oxides with which the scraps are always more or less impregnated, thus setting free the oily and fatty ingredients, which can be readily expressed from the mass after the treatment.

Different kneading appliances may be adopted in carrying out my invention, but I prefer that described in my Letters Patent No. 47,264, granted to me on the 18th of April 1865.

I claim as my invention—

The process of extracting fatty and oily matter from curriers' and tanners' scraps and other offal, by kneading and crushing the same in dilute acid in the manner described.

In testimony whereof, I have signed my name to this specification in the presence of two subscribing witnesses.

WILLIAM ADAMSON.

Witnesses:
  HARRY SMITH,
  HUBERT HOWSON.